(12) United States Patent
Paris et al.

(10) Patent No.: US 12,010,013 B2
(45) Date of Patent: Jun. 11, 2024

(54) DEVICES AND METHOD FOR CONTROLLING NETWORK ROUTING CONFIGURATIONS

(71) Applicant: Huawei Technologies Co., Ltd., Shenzhen (CN)

(72) Inventors: Stefano Paris, Munich (DE); Jeremie Leguay, Boulogne Billancourt (FR); Wei Chen, Nanjing (CN); Qian Cao, Nanjing (CN); Davide Sanvito, Milan (IT); Antonio Capone, Milan (IT); Ilario Filippini, Milan (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 17/396,367

(22) Filed: Aug. 6, 2021

(65) Prior Publication Data

US 2021/0367882 A1 Nov. 25, 2021

Related U.S. Application Data

(63) Continuation of application No. PCT/EP2019/053098, filed on Feb. 8, 2019.

(51) Int. Cl.
*H04L 45/00* (2022.01)
*H04L 45/02* (2022.01)
*H04L 47/125* (2022.01)

(52) U.S. Cl.
CPC .............. *H04L 45/38* (2013.01); *H04L 45/02* (2013.01); *H04L 45/04* (2013.01); *H04L 45/46* (2013.01); *H04L 47/125* (2013.01)

(58) Field of Classification Search
None
See application file for complete search history.

(56) References Cited

U.S. PATENT DOCUMENTS

| | | |
|---|---|---|
| 6,574,669 B1 | 6/2003 | Weaver |
| 7,388,842 B1 | 6/2008 | Applegate et al. |

(Continued)

FOREIGN PATENT DOCUMENTS

| | | |
|---|---|---|
| CN | 102143042 A | 8/2011 |
| CN | 104935476 A | 9/2015 |

(Continued)

OTHER PUBLICATIONS

Kang et al., "Efficient Traffic Splitting on Commodity Switches," Proceedings of the 11th ACM International on Conference on emerging Networking Experiments and Technologies (CoNEXT), Total 13 pages, Heidelberg, Germany (Dec. 1-4, 2015).

(Continued)

*Primary Examiner* — Joshua Joo
(74) *Attorney, Agent, or Firm* — Leydig, Voit & Mayer, Ltd.

(57) ABSTRACT

A device for controlling network routing configurations is configured to obtain a predicted traffic matrix and a plurality of traffic matrices, and to determine, from a plurality of clusters, arranged in a hierarchical structure over the predicted traffic matrix and the plurality of traffic matrices, a first cluster allocated to a lower hierarchy level that contains the predicted traffic matrix. Each of the clusters is associated with a routing configuration, and the plurality of clusters are allocated to at least two different hierarchy levels. The device selects, from the plurality of clusters, a second cluster allocated to a higher hierarchy level that includes at least the first cluster and a third cluster allocated to the lower hierarchy level that contains a current traffic matrix, determine a second routing configuration associated with the second cluster; and activate the second routing configuration as a network routing configuration.

14 Claims, 10 Drawing Sheets

(56) References Cited

U.S. PATENT DOCUMENTS

| | | | |
|---|---|---|---|
| 7,433,315 B2 | 10/2008 | Bhatia et al. | |
| 7,957,266 B2 | 6/2011 | Kodialam et al. | |
| 8,228,803 B1* | 7/2012 | Ge | H04Q 3/0062 |
| | | | 370/238 |
| 8,477,597 B2 | 7/2013 | Zhang et al. | |
| 2005/0147031 A1 | 7/2005 | Bhatia et al. | |
| 2009/0059793 A1 | 3/2009 | Greenberg | |
| 2010/0302935 A1 | 12/2010 | Zhang et al. | |
| 2011/0188378 A1* | 8/2011 | Collins | H04L 41/145 |
| | | | 370/236 |
| 2012/0087377 A1* | 4/2012 | Lai | H04L 45/04 |
| | | | 370/427 |
| 2015/0327135 A1* | 11/2015 | Luo | H04W 36/08 |
| | | | 370/238 |
| 2017/0083477 A1* | 3/2017 | Palmer | G06F 13/1694 |
| 2017/0279698 A1* | 9/2017 | Sartran | H04L 43/0876 |
| 2017/0346701 A1* | 11/2017 | Perrett | H04L 41/147 |
| 2020/0204490 A1* | 6/2020 | Choudhury | H04L 43/20 |
| 2021/0367882 A1* | 11/2021 | Paris | H04L 45/04 |
| 2023/0244548 A1* | 8/2023 | Diot | G06F 9/45558 |
| | | | 718/1 |

FOREIGN PATENT DOCUMENTS

| | | |
|---|---|---|
| CN | 107317697 A | 11/2017 |
| WO | 2016160401 A1 | 10/2016 |
| WO | 2018219420 A1 | 12/2018 |

OTHER PUBLICATIONS

Wang et al., "COPE: Traffic Engineering in Dynamic Networks," SIGCOMM '06: Proceedings of the 2006 conference on Applications, technologies, architectures, and protocols for computer communications, pp. 99-110, Pisa, Italy, (Sep. 11-15, 2006).

Tabatabaee et al., "Robust Routing with Unknown Traffic Matrices," Technical Research Report, IEEE INFOCOM 2007—26th IEEE International Conference on Computer Communications, Total 11 pages, Institute of Electrical and Electronics Engineers, New York, New York (May 2007).

Ben-Ameur et al., "Robust routing and optimal partitioning of a traffic demand polytope," International Transactions in Operational Research, Total 28 pages (Aug. 2010).

Casas et al., "Multi Hour Robust Routing and Fast Load Change Detection for Traffic Engineering," 2008 IEEE International Conference on Communications, pp. 5777-5782, Institute of Electrical and Electronics Engineers, New York, New York (May 2008).

Zhang et al., "Finding Critical Traffic Matrices," 2005 International Conference on Dependable Systems and Networks (DSN'05), Total 10 pages, Institute of Electrical and Electronics Engineers, New York, New York (Jun. 28-Jul. 1, 2005).

Silva et al., "Solving the bifurcated and nonbifurcated robust network loading problem with k-adaptive routing," HAL, Total 43 pages, (Jun. 13, 2017).

Poss et al., "Affine recourse for the robust network design problem: Between static and dynamic routing," HAL, Total 38 pages (Dec. 11, 2013).

Ben-Ameur et al., "Multipolar routing: where dynamic and static routing meet," Electronic Notes in Discrete Mathematics, vol. 41, pp. 61-68, Elsevier B.V. (Jun. 5, 2013).

Mizrahi et al., "TimeFlip: Scheduling Network Updates with Timestamp-based TCAM Ranges," 2015 IEEE Conference on Computer Communications (INFOCOM), pp. 2551-2559, Institute of Electrical and Electronics Engineers, New York, New York (Apr. 26-May 1, 2015).

Applegate et al., "Making Intra-Domain Routing Robust to Changing and Uncertain Traffic Demands: Understanding Fundamental Tradeoffs," SIGCOMM '03: Proceedings of the 2003 Conference on Applications, Technologies, Architectures, and Protocols for Computer Communication, pp. 313-324, Karlsruhe, Germany, (Aug. 25-29, 2003).

Casas et al., "Robust Routing Mechanisms for Intradomain Traffic Engineering in Dynamic Networks," 2009 Latin American Network Operations and Management Symposium, Total 10 pages, Institute of Electrical and Electronics Engineers, New York, New York (Oct. 2009).

* cited by examiner

DEVICES AND METHOD FOR CONTROLLING NETWORK ROUTING CONFIGURATIONS

CROSS-REFERENCE TO RELATED APPLICATIONS

This application is a continuation of International Application No. PCT/EP2019/053098, filed on Feb. 8, 2019, which is hereby incorporated by reference in its entirety.

FIELD

The present disclosure relates to the field of Traffic Engineering (TE) in a network, e.g., in a Software Defined Network (SDN). The present disclosure particularly relates to routing traffic through the network. To this end, the present disclosure relates to a device for controlling network routing configurations, and a corresponding method. The controlling of the network routing configurations is based on traffic matrices, which are grouped into clusters of different hierarchy level.

BACKGROUND

TE plays a crucial role in network management, since it permits optimizing the utilization of network resources. Nowadays, e.g., SDN controllers or Path Computation Elements (PCE) integrate TE methods, in order to continuously optimize the network. However, sudden and unpredictable changes of the network, e.g., traffic variations and/or network failures, still pose a major challenge for conventional TE methods. The conventional TE methods, which have been devised to cope with network changes, can be broadly classified into three classes: Dynamic TE, Static TE and Semi-Static TE.

Dynamic TE reconfigures the network each time a new event, like a traffic change or link failure, occurs in the network. A monitoring system is typically used by Dynamic TE methods, in order to collect information over a relatively short period of time, and to predict the future evolution of the network system. For example, a certain number of past traffic matrices is used to predict the next traffic matrix. This prediction is then used as an input of the Dynamic TE methods to reconfigure the network. Sophisticated methods, like linear programming, can be used to compute the best network configuration any time the traffic changes. However, reconfiguring the network too frequently can affect its stability, since programming hardware equipment takes time. Thus, too frequent network reconfigurations may result in worse performance. For this reason, TE methods reducing the number of network reconfigurations have also been proposed, e.g., methods that reconfigure the network only, if the benefit of the reconfiguring, as captured by an objective function, is larger than the benefit of further using the current network configuration. Nonetheless, the efficacy of Dynamic TE methods depends on the accuracy of the prediction method that is used to estimate the evolution of the system. Indeed, prediction errors can lead to large deviations of the network performance when optimized by Dynamic TE methods.

Figure 9:
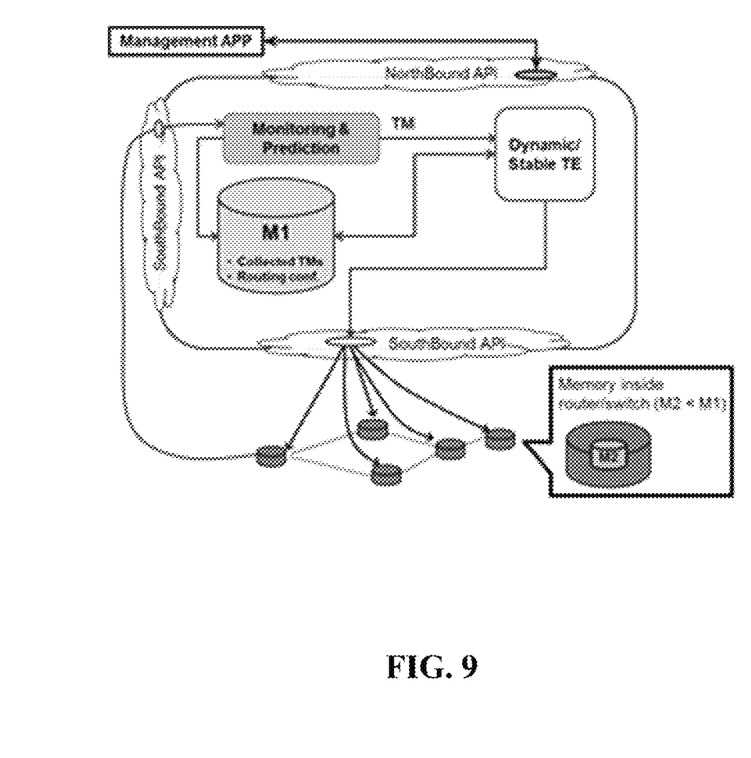
FIG. 9 shows an example of three clusters of traffic matrices and three associated routing configurations.

FIG. 9 shows an example of a general architecture of a SDN controller, wherein the information collected by a monitoring system is used by a Dynamic TE mechanism, in order to predict the next status of the network system, and to accordingly compute/update a network routing configuration.

In contrast to Dynamic TE described above, Stable TE computes a single configuration, which provides bounded performance loss, in case of prediction errors or unpredictable events, with respect to the optimal configuration. One of the first techniques of Stable TE is oblivious routing, which randomly selects the paths (routes) to connect a source and destination using a small subset of preselected nodes without using any knowledge of the traffic. Routing techniques that are totally oblivious to any traffic information and system changes can provide the highest robustness against any system evolution. However, the performance loss can quickly become large as the network size increases. For this reason, a partial knowledge of the traffic can also be integrated in the computation of the network configuration to improve oblivious routing.

Some Stable TE methods compute a network configuration with performance guarantees for any traffic matrix (TM) that belongs to a bounded domain/set obtained using the information collected by the monitoring system. Other methods introduce different models for traffic uncertainness, e.g., by expressing the maximum load that can be expected over a link (pipe model) or an upper bound on the traffic emanating from a source node and directed to a destination node (hose model). Based on those models a network configuration with performance guarantees is computed. However, these uncertainness models include less information than the multiple TM approach, thus providing larger performance losses. To further improve the optimality of the solution, some methods consider only the most likely TMs for building the bounded set and computing of the optimal configuration. A penalty term is added in the optimization for less probable TMs. While such a method provides a good solution when the traffic varies smoothly, it cannot guarantee a feasible configuration against unexpected or unlikely events, since they are excluded from the computation.

Finally, Semi-Static TE methods provide a limited set of routing configurations. This allows, on the one hand, to not reconfigure the network as frequently as in Dynamic TE. On the other hand, it also limits the robustness of each single routing configuration, thus reducing the performance loss. Some approaches divide the TM polytope in few subsets according to some dimensions, and compute a robust routing for each subset. While representing an initial attempt to split the TM domain in multiple parts, these approaches present several limitations: slicing directions are arbitrary; the number of created subsets is limited; and the partition is performed either in the traffic domain or in the time domain. Therefore, they can achieve only a limited performance improvement compared to the whole set of TM-space splitting possibilities. More sophisticated approaches, like affine and multi-polar routing, have been proposed more recently to overcome these limitations. In particular, these techniques compute a set of routing configurations that can be easily combined together to generate a routing configuration for a new traffic realization. However, the combination of multiple configurations can result in the utilization of a large number of paths and a flow split ratio that might not be handled by network devices.

Among the whole set of Semi-static TE methods, only few of them consider how anomalies or wrong predictions of the TM space impact the choice of the best split options. Within this set of methods, most of them just provide a robustness analysis of the original clustering technique, without explicitly designing a method to manage inaccurate predictions. In another approach, in order to manage anomalies, the normal operation TM polytope is expanded in the direction of the anomaly to include it. A new robust routing configuration is computed for the new polytope and used whenever the anomaly occurs. The limitations of this technique are the necessity of predicting any possible anomaly to properly enlarge the TM polytope and the absence of any reconfiguration frequency guarantee, as the configuration change is anomaly-driven.

There are several ways in which routing updates have been traditionally implemented. The most straightforward approach is "break-before-make", which consists in stopping the communication between source and destination, waiting for all packets on route to arrive at their destination, removing the relevant entries from the routing tables of the routers along the current route, establishing the new route by instructing the routers along the new route to have an entry for the connection, and at last, resuming the communication.

However, in addition to a long time required to complete the update, this results in stopping the connection for a significant time period and possibly losing packets that are already traversing the original route. The opposite approach, "make-before-break", which activates the new path before deactivating the old one, can alleviate the packet dropping issue, but it still may lead to a slow transition process. More recently, update techniques based on synchronization of devices' clock have been proposed, in order to maintain network-wide consistency with micro-second accuracy. However, these techniques require strict time synchronization, which could be an inadmissible overhead.

SUMMARY

In view of the above-mentioned TE methods and their disadvantages, embodiments of the present disclosure provide an improved approach to TE. In particular, the disclosure provides an improved control of network routing configurations over time. Embodiments of the disclosure allow for a smoother updating/changing of network routing configurations, particularly in case of sudden and unpredictable changes of the network. The approach of the disclosure is usable together with Dynamic TE, Static TE or Semi-static TE methods. The updating/changing of the network routing configurations includes the smooth updating of routes (paths) of one routing configuration to the routes of another routing configuration.

Figure 10:
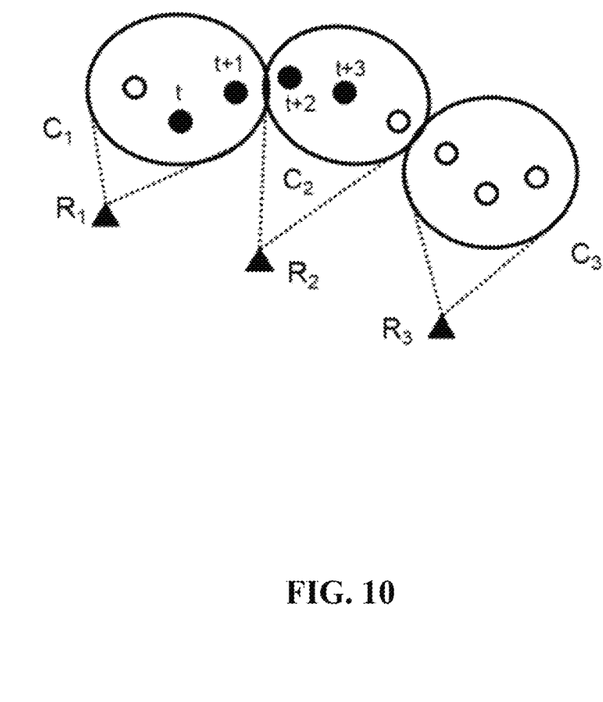
FIG. 10 shows an example architecture of a SDN controller configured for Dynamic TE.

Changing all the routes of a network routing configuration to all the routes of another network routing configuration instantaneously, e.g., in case of a sudden and unpredictable network change, is very difficult, as this would require perfect synchronization between network equipment. FIG. 10 shows a scenario, in which three Stable TE network routing configurations (R1, R2, and R3, each associated with a cluster C1, C2 and C3 of traffic matrices) are successively applied in all network equipment (e.g., switches). The main issue in such a scenario is that an abrupt network routing configuration change (e.g., from R1 to R2, or R2 to R3) can lead to packet losses, and "make-before break" approaches may not be applicable without dead locks (i.e. without packet losses).

Thus, the embodiments of the disclosure base on the proposal to build a hierarchy of clusters of traffic matrices, which are each associated with a routing configuration. That is, effectively a hierarchy of routing configurations is built. This enables pre-fetching a parent routing configuration (higher hierarchy level) and then removing it in the transition between two child routing configurations (lower hierarchy level), in order to smoothly update the network from one child routing configuration to the other. Thereby, load balancing weights may also be used, in order to progressively move the traffic in the evolving set of routes of the respective routing configurations.

A first aspect of the disclosure provides a device for controlling network routing configurations in a network, the device being configured to: obtain a predicted traffic matrix and a plurality of traffic matrices; determine, from a plurality of clusters, the clusters being arranged in a hierarchical structure over the predicted traffic matrix and the plurality of traffic matrices, a first cluster allocated to a lower hierarchy level that contains the predicted traffic matrix, wherein each of the plurality of clusters is associated with a routing configuration, and the plurality of clusters are allocated to at least two different hierarchy levels, a cluster allocated to a higher hierarchy level including multiple adjacent clusters allocated to the hierarchy level below; select, from the plurality of clusters, a second cluster allocated to a higher hierarchy level that includes at least the first cluster and a third cluster allocated to the lower hierarchy level that contains a current traffic matrix; determine a second routing configuration associated with the second cluster; and activate the second routing configuration as a network routing configuration.

Notably, a cluster is/includes a set of TMs. The plurality of traffic matrices may be, or may be based on, past observations, synthetic traffic scenarios and/or past predictions (i.e. past predicted traffic matrices). A routing configuration is then assigned to each cluster, not to each individual TM included in the cluster. The routing configuration is valid for all TMs contained in the cluster. Clustering TMs is in principle known (see above). A network routing configuration is a routing configuration currently valid for the network. The first cluster is particularly the lowest-hierarchy-level cluster containing the predicted TM (parent clusters including that cluster also contain the predicted TM), and the third cluster is particularly the lowest-hierarchy-level cluster that contains the current traffic matrix.

By setting the routing configuration of the second cluster as a network routing configuration, wherein the second cluster is of a higher hierarchy level and thus contains the routes of the routing configurations associated with each of the third cluster (containing the current traffic matrix) and of the first cluster (containing the predicted traffic matrix, i.e. the routes currently active), a smooth transition between the routing configurations is obtained. Further, a smooth transition can be obtained towards setting the routing configuration associated with the first cluster as the network routing configuration. A smooth transition is particularly possible in case of sudden and/or unpredictable network changes. The device of the first aspect is compatible with Dynamic TE, Static TE, or Semi-Static TE.

In an implementation form of the first aspect, the device is further configured to, for activating the second routing configuration: send a command indicating the second routing configuration to a plurality of or all switches in the network.

Thus, the second routing configuration can be implemented in all switches as a network routing configuration.

In an implementation form of the first aspect, the device is further configured to, for activating the second routing configuration: determine a weight for each routing path of a plurality of routing paths contained in the second routing configuration; and activate the routing paths of the second routing configuration.

In this way, load balancing can be decoupled from routing. Different time scales of load balancing and changing of routing configurations can be implemented.

In an implementation form of the first aspect, the device is further configured to, for activating the second routing configuration: send a command indicating the determined weights of the plurality of routing paths of the second routing configuration to a plurality of or all switches in the network.

Thus, the load balancing can be implemented in all switches.

In an implementation form of the first aspect, the device is further configured to: deactivate a routing configuration as a network routing configuration, in particular by deactivating each routing path of a plurality of routing paths contained in the routing configuration, if the routing configuration is associated with a cluster that does not contain the predicted traffic matrix.

In an implementation form of the first aspect, the device is further configured to: determine a first routing configuration associated with the first cluster; and activate the first routing configuration as a network routing configuration.

Thus, a transition from a third routing configuration associated with the third cluster to the first routing configuration associated with the first cluster, via the second routing configuration associated with the higher-hierarchy level second cluster, can be implemented smoothly.

In an implementation form of the first aspect, the device is further configured to: select, as the second cluster, a cluster allocated to a higher hierarchy level that is determined based on a deviation of the predicted traffic matrix from the current traffic matrix.

In an implementation form of the first aspect, the device is further configured to: determine a higher hierarchy level further up in case of a larger deviation and a higher hierarchy level further down in case of a smaller deviation.

Thus, sudden and/or unpredictable changes of the traffic matrix, e.g., indicating some anomaly or failure in the network, can be effectively dealt with.

In an implementation form of the first aspect, the device is further configured to: merge at least two adjacent clusters on the same hierarchy level to generate a new cluster on a hierarchy level further up.

Thus, the device is able to create new clusters and hierarchy levels of clusters.

In an implementation form of the first aspect, the device is further configured to, for merging the at least two adjacent clusters: merge the traffic matrices contained in each of the at least two adjacent clusters into a set of traffic matrices; calculate a convex polyhedral approximating the convex hull of the set; and keep extreme points of the convex polyhedral.

In an implementation form of the first aspect, the device is further configured to: generate a new routing configuration associated with the new cluster based on the routing configurations associated respectively with each of the at least two adjacent clusters.

In an implementation form of the first aspect, the device is further configured to: generate the plurality of clusters allocated to the at least two hierarchy levels.

A second aspect of the disclosure provides a method for controlling network routing configurations in a network, the method comprising: obtaining a predicted traffic matrix; determining, from a plurality of clusters, a first cluster that allocated to a lower hierarchy level that contains the predicted traffic matrix, wherein each of the plurality of clusters contains a plurality of traffic matrices, each of the plurality of clusters is associated with a routing configuration, and the plurality of clusters are allocated to at least two different hierarchy levels, a cluster allocated to a higher hierarchy level including multiple adjacent clusters allocated to the hierarchy level below; selecting, from the plurality of clusters, a second cluster allocated to a higher hierarchy level that includes at least the first cluster and a third cluster allocated to the lower hierarchy level that contains a current traffic matrix; determining a second routing configuration associated with the second cluster; and activating the second routing configuration as a network routing configuration.

In an implementation form of the second aspect, the method further comprises, for activating the second routing configuration: sending a command indicating the second routing configuration to a plurality of or all switches in the network.

In an implementation form of the second aspect, the method further comprises, for activating the second routing configuration: determining a weight for each routing path of a plurality of routing paths contained in the second routing configuration; and activating the routing paths of the second routing configuration.

In an implementation form of the second aspect, the method further comprises, for activating the second routing configuration: sending a command indicating the determined weights of the plurality of routing paths of the second routing configuration to a plurality of or all switches in the network.

In an implementation form of the second aspect, the method further comprises: deactivating a routing configuration as a network routing configuration, in particular by deactivating each routing path of a plurality of routing paths contained in the routing configuration, if the routing configuration is associated with a cluster that does not contain the predicted traffic matrix.

In an implementation form of the second aspect, the method further comprises: determining a first routing configuration associated with the first cluster; and activating the first routing configuration as a network routing configuration.

In an implementation form of the second aspect, the method further comprises: selecting, as the second cluster, a cluster allocated to a higher hierarchy level that is determined based on a deviation of the predicted traffic matrix from the current traffic matrix.

In an implementation form of the second aspect, the method further comprises: determining a higher hierarchy level further up in case of a larger deviation and a higher hierarchy level further down in case of a smaller deviation.

In an implementation form of the second aspect, the method further comprises: merging at least two adjacent clusters on the same hierarchy level to generate a new cluster on a hierarchy level further up.

In an implementation form of the second aspect, the method further comprises, for merging the at least two adjacent clusters: merging the traffic matrices contained in each of the at least two adjacent clusters into a set of traffic matrices; calculating a convex polyhedral approximating the convex hull of the set; and keeping extreme points of the convex polyhedral.

In an implementation form of the second aspect, the method further comprises: generating a new routing configuration associated with the new cluster based on the routing configurations associated respectively with each of the at least two adjacent clusters.

In an implementation form of the second aspect, the method further comprises: generating the plurality of clusters allocated to the at least two hierarchy levels.

The method of the second aspect and its implementation forms achieve the same advantages and effects than the device of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, these methods and functionalities can be implemented in respective software or hardware elements, or any kind of combination thereof.

BRIEF DESCRIPTION OF DRAWINGS

The above described aspects and implementations of the present disclosure will be explained in the following description of specific embodiments in relation to the enclosed drawings, in which.

DETAILED DESCRIPTION

Figure 1:
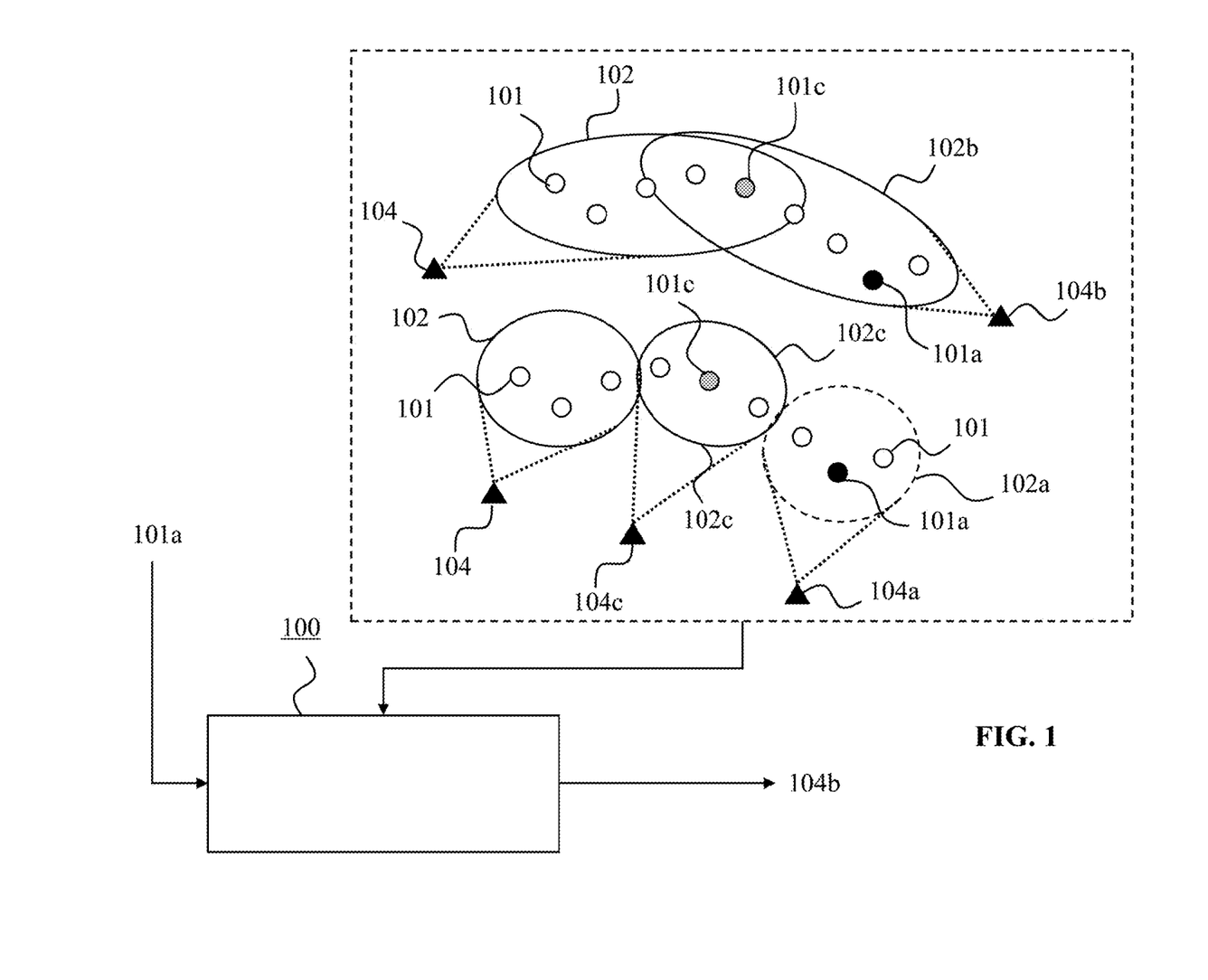
FIG. 1 shows a device according to an embodiment of the disclosure.

FIG. 1 shows a device according to an embodiment of the disclosure. The device 100 is in particular configured to control network routing configurations in/of a network.

The device 100 is to this end configured to obtain a predicted traffic matrix 101a and a plurality of traffic matrices 101, e.g., history traffic matrices. The device 100 may predict the predicted traffic matrix 101a itself, e.g., based on historical information about the traffic, or may receive the predicted traffic matrix 101a from another device or unit, e.g., a controller or a dedicated traffic matrix prediction device.

The device 100 is further configured to determine a first cluster 102a and a second cluster 102b from a plurality of clusters 102. The clusters 102 of the plurality of clusters 102 are arranged in a hierarchical structure over the predicted traffic matrix 101a and the plurality of traffic matrices 101. In particular, the clusters 102 are allocated to at least two different hierarchy levels. Thereby, a cluster 102 allocated to a higher hierarchy level includes at least two adjacent clusters 102 allocated to the hierarchy level below. Further, each cluster 102 is associated with a routing configuration 104. The device 100 may be configured to maintain and manage (e.g., create) the clusters 102 itself, or may be provided with the information regarding the clusters 102 from another device.

The first cluster 102a is allocated to a lower hierarchy level—for instance to the lowest hierarchy level—that contains the predicted traffic matrix 101a. The second cluster 102b is allocated to a higher hierarchy level—for instance to a hierarchy level that is one or more levels above the lower/lowest hierarchy level associated with the first cluster 102a—that includes at least the first cluster 102a and a third cluster 102c. Thereby, the third cluster 102c is allocated to the lower/lowest hierarchy level that contains a current traffic matrix 101c. That is, the first cluster 102a and the third cluster 102c may be on the same hierarchy level, but this is not crucial. The second cluster 102c may contain further clusters 102, either in case that—in the hierarchical structure that is used—a cluster 102 on a higher hierarchy level includes more than two adjacent clusters 102 of the hierarchy level below, or in case that the second cluster 102c is more than one hierarchy level above the first and/or the third cluster 102.

Further, the device 100 is configured to determine a second routing configuration 104b associated with the second cluster 102b, and to activate the second routing configuration 104b as a network routing configuration.

Thus, a smooth transition from the first routing configuration 104a associated with the first cluster 102a (including a first set of routes) to the second routing configuration 104b (including the first set of routes and a second set of routes, namely the routes of the third routing configuration 104c associated with the third cluster 102c), and further to the third routing configuration 104c (including the second set of routes) can be achieved.

Figure 2:
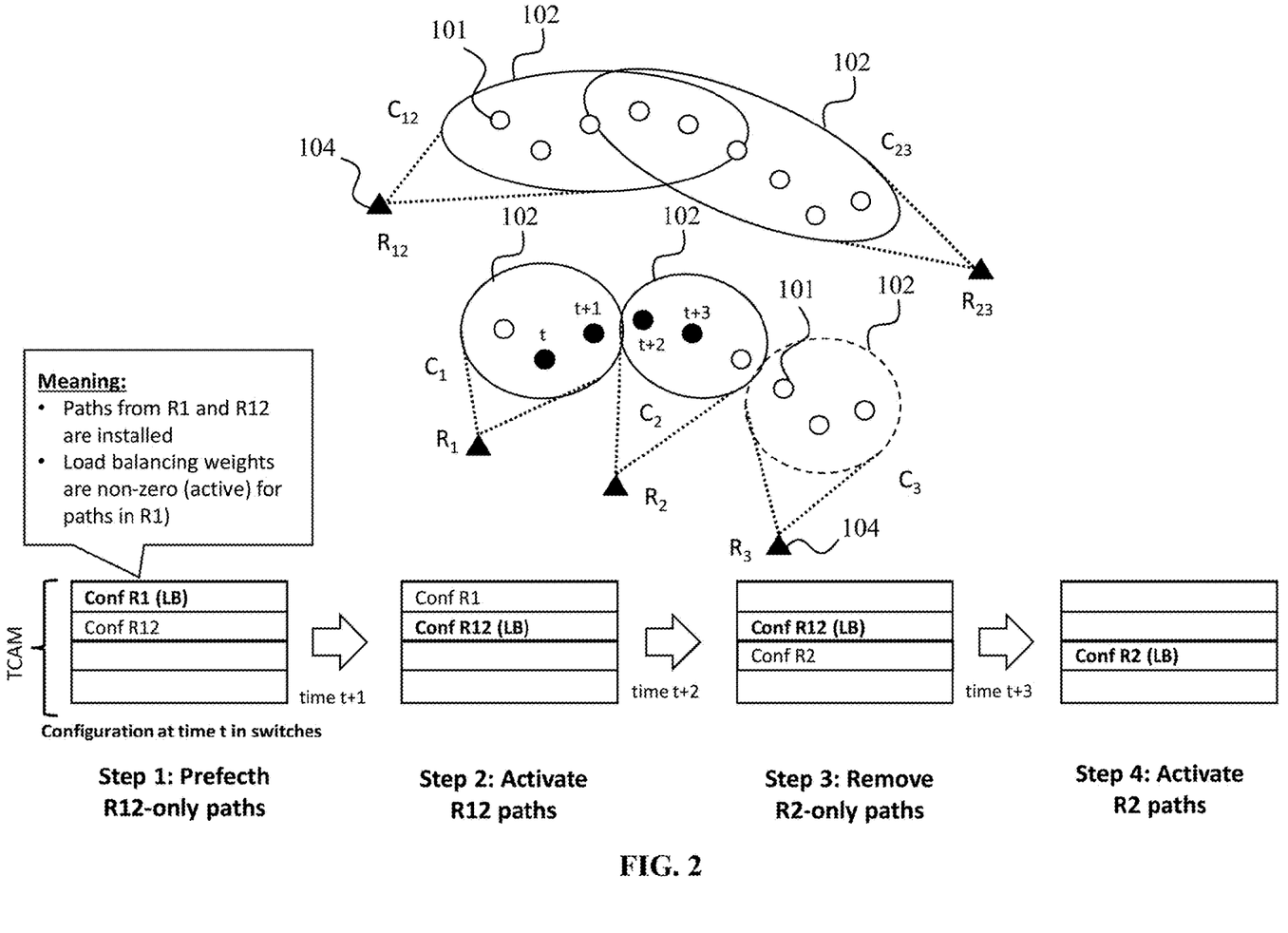
FIG. 2 shows an example procedure carried out by a device according to an embodiment of the disclosure.

FIG. 2 shows this in more detail. In particular, FIG. 2 shows how with the device 100 according to an embodiment of the disclosure, smoothly moving from one routing configuration R1 (corresponding to the first routing configuration 104a in FIG. 1) to another routing configuration R2 (corresponding to the third routing configuration 104c in FIG. 1) is possible, particularly by considering an overlapping parent routing configuration R12 (corresponding to the second routing configuration 104b in FIG. 1), which typically consist of the union of the routing configurations R1 and R2.

The device 100 is configured to first slowly pre-fetch the parent routing configuration R12 in all switches in the network. Once this is done, the device 100 is configured to remove routes of R1 from the switches. In this process, at a higher frequency, the device 100 may adjust load balancing weights in four steps:

At Step 1 (pre-fetching of R12): load balancing is achieved on the set of routes of R1 as the new routes of R12 coming from R2 are not all installed.

At Step 2 (activation of R12): load balancing is achieved on R12 as all routes are installed.

At Step 3 (removal of R1): load balancing is achieved on R2, while R1 routes are being removed.

At Step 4 (activation of R2): load balancing is achieved on R2.

FIG. 2 describes graphically the above four-step process. On the top, FIG. 2 shows that parent routing configurations R12 and R23, associated with clusters C12 and C23 of traffic matrices on a higher hierarchy level, overlap with their child routing configurations R1, R2 and R3, which are associated respectively with clusters C1, C2 and C3 of traffic matrices on the hierarchy level below. At the bottom, FIG. 2 depicts the evolution of the forwarding table for one switch.

Figure 3:
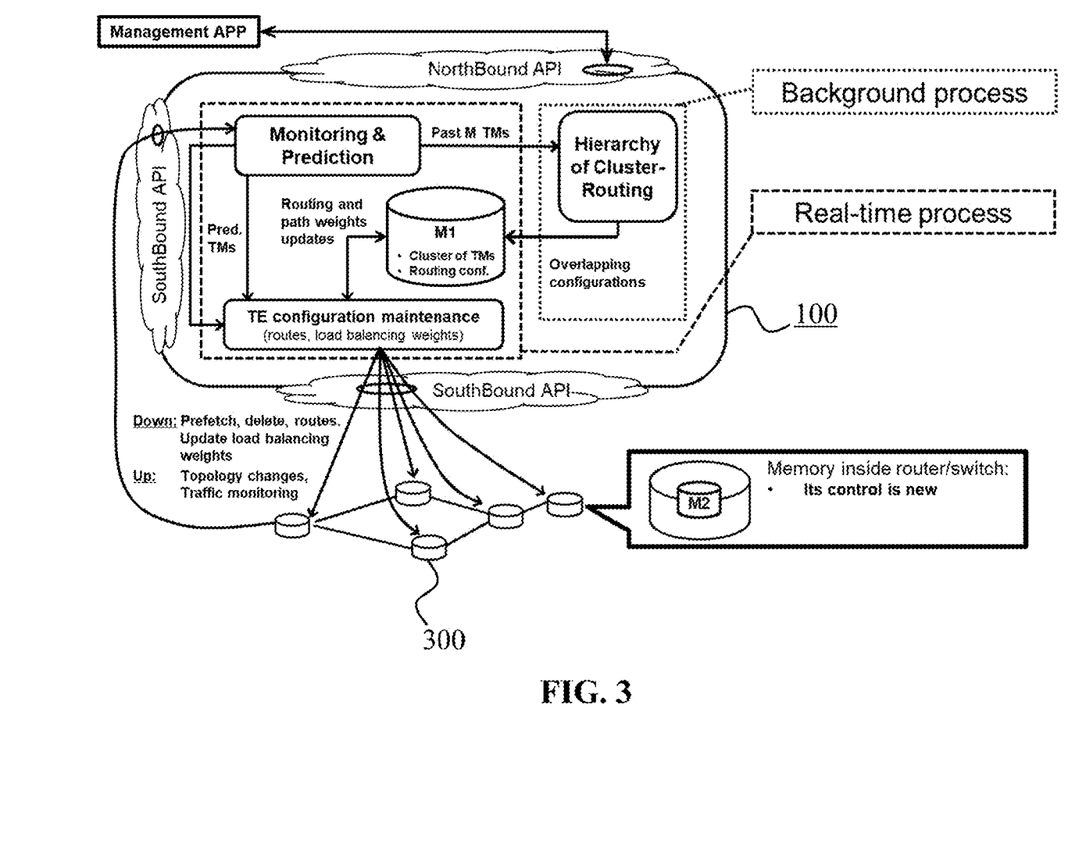
FIG. 3 shows a device according to the present disclosure implemented in an architecture of a SDN controller.

As illustrated in FIG. 3, the device 100 may be implemented in or as a SDN controller. The device 100 may include at least two modules: a Hierarchy of Cluster-Routing (HCR) generator module and a TE Configuration Maintenance (TCM) module.

The HCR module starts from a set of Cluster-Routing solutions (i.e. routing configurations 104 associated with clusters 102) computed over clusters 102 of TMs 101. Each cluster 102 contains a set of subsequent TMs 101 and an associated routing configuration 104, wherein the routing configuration 104 is built to be robust against traffic variations within the cluster 102. These solutions may be provided by a clustering algorithm like a Clustered Robust Routing (CRR). Starting from this initial set, the HCR can build a set of parent Cluster-Routing solutions (i.e. higher-level routing configurations 104 associated with higher-level clusters 102) wherein each routing configuration 104 is the aggregate of pairs of consecutive Cluster-Routing solutions of the lower level. The operation can be iterated to build a hierarchy structure, wherein each parent routing configuration 104 is the aggregation of, e.g., pairs of child routing configurations of the lower hierarchy level.

The TCM may decide, which routing configurations 104 computed by the HCR are to be stored in and activated by switches 300 in the network, in order to smoothly move between two routing configurations 104. More specifically, when the TM 101 is moving towards a different cluster 102 than the one associate with the current routing configuration 104, a cluster-routing pair of higher level in the hierarchy may be selected. The module selects the cluster-routing pairs so that the cluster contains the predicted TM 101a. The associated routing configuration 104 (i.e., the routing associated to the selected cluster-routing pair 102/104) is then loaded in all switches 300. By construction, the set of routes in the new routing configuration 104 is a super-set of the routes currently configured in the network switches 300, since the selected cluster-routing pairs is at a higher level in the hierarchy.

The TCM also computes the new split-ratio of the different routes that are pre-fetched in the switches 300. Since during the transition the pre-fetched configuration 104 contains a superset of the routes currently installed in the switches 300, the transition can be smooth. This means that old routes will not be abruptly removed, but the traffic is moved from the old routes to the new routes in a smooth way.

Both modules may be continuously executed by the device 100. The HCR may thereby be executed at a lower frequency to update the clusters 102 and routing configurations 104 as new information is available, whereas the TCM may be executed at a higher frequency to keep the network in its best configuration as the system evolves, and to orchestrate the transitions between the routing configurations 104.

Figure 4:
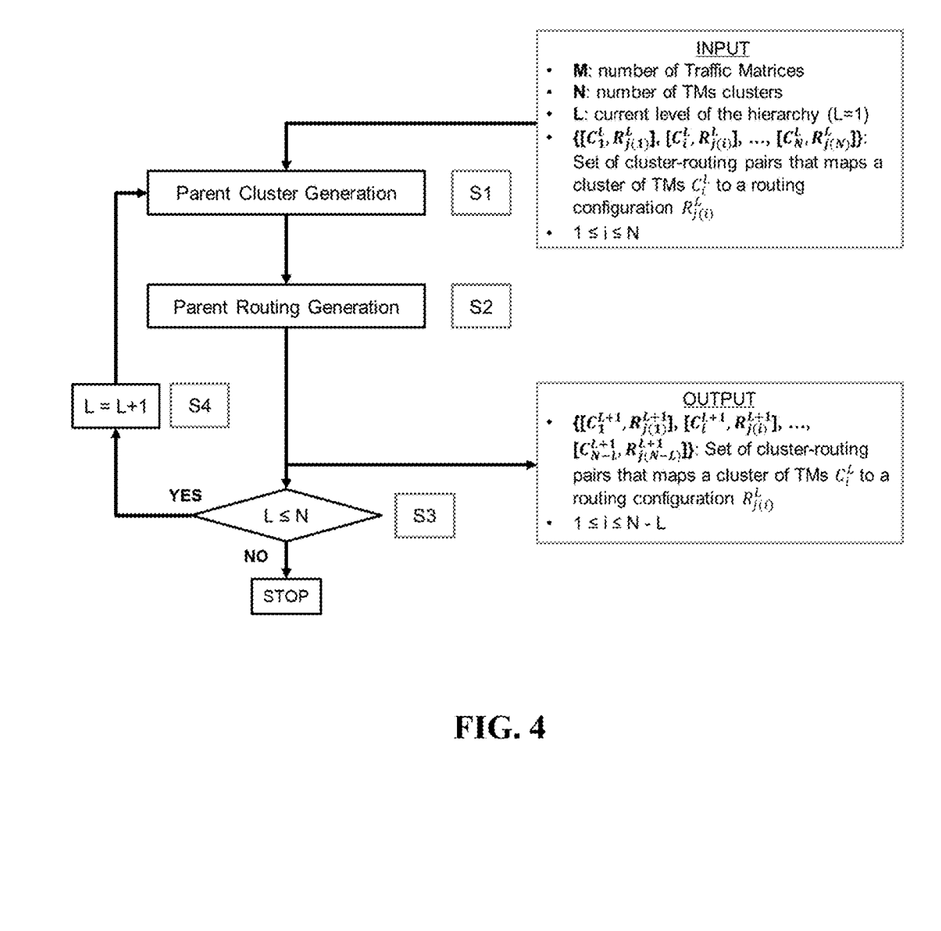
FIG. 4 shows a procedure performed by a device according to an embodiment of the disclosure.

The HCR module illustrated in FIG. 4 may include two sub-modules/functions: the Parent Cluster Generation and the Parent Routing Generation. Both modules may be executed on-demand whenever new routing solutions are to be generated, e.g., as follows with respect to FIG. 4.

S1: pairs of adjacent clusters 102 are merged together to create a parent cluster 102 including the union of the TMs 101 member of each cluster 102. A set of N−1 parent clusters 102 may be created.

S2: for each parent cluster 102 a corresponding parent routing configuration 104 is generated, wherein the set of routes of each routing configuration 104 is the union of the routes of the two child clusters 102, and a set of load balancing weights over the new set of routers is computed.

S3-S4: if the top of the hierarchy has not been reached yet (i.e. if there are at least two clusters 102 at the current level L) the process is reiterated starting from the set of cluster-routing pairs of the current hierarchy level L.

The TCM module orchestrates the pre-fetching and the activation of the routing configurations 104. Whenever a transition from, e.g., routing configuration $R_j^L$ to $R_{j+1}^L$ starts, the module may pre-fetch the corresponding parent routing configuration $R_j^{L+1}$, and then activate it by load balancing the traffic over the associated sets of routes. Routing configuration $R_j^L$ may then be removed, and the $R_{j+1}^L$ routing configuration is pre-fetched. Finally, the transition towards $R_{j+1}^L$ is completed by load balancing the traffic over the final set of routes of $R_{j+1}^L$ of and by removing the routing configuration $R_j^{L+1}$.

Figure 5:
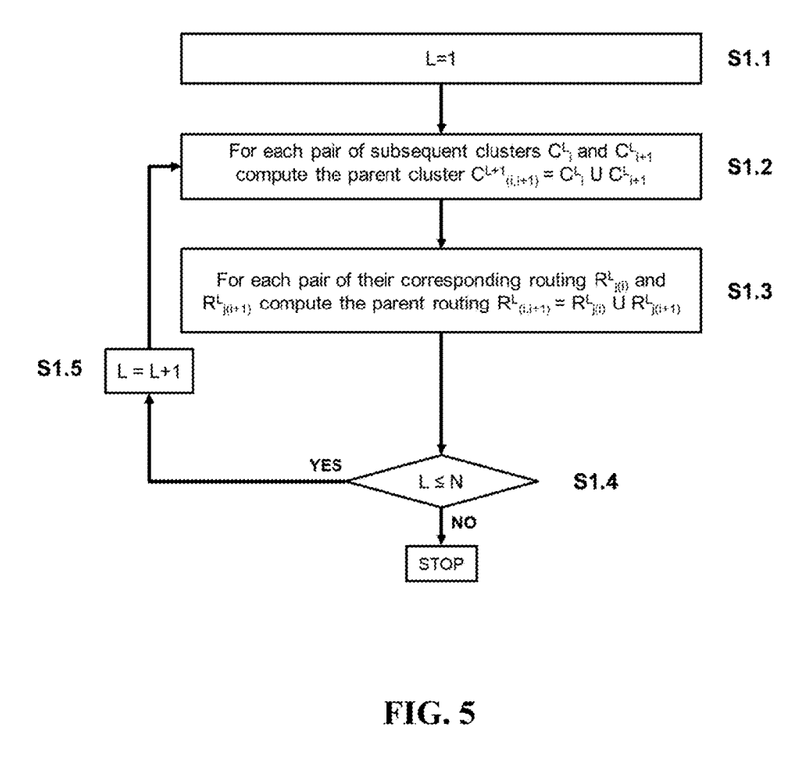
FIG. 5 shows a procedure performed by a device according to an embodiment of the disclosure.

Operations performed by the HCR module are detailed in FIG. 5 and described hereafter.

S1.1: the HCR module initializes the level of the hierarchy: L=1.

S1.2: for each pair of subsequent clusters 102 (adjacent in time) at level L, the HCR creates a new cluster 102 of a higher level L+1 by merging the two clusters 102. To this end, the TMs 101 of the two clusters 102 of level L may be merged in a new set and the convex polyhedral approximating the convex hull of the new set may be computed. The extreme points of the convex polyhedral may be kept.

S1.3: for the new cluster $C_{(i,i+1)}^{L+1}$, the HCR computes the associate routing configuration $R_{(i,i+1)}^{L+1}$ by merging the paths of the routing configurations $R_{j(i)}^L$ and $R_{j(i+1)}^L$ associated at the subsequent clusters $C_i^L$ and $C_{i+1}^L$ of the lower level L.

S1.4: if the actual level L is larger than the maximum number of levels in the hierarchy structure, the execution is stopped. Otherwise it is proceeded with step S1.5.

S1.5: the HCR increments the level of the hierarchy: L:=L+1.

Figure 6:
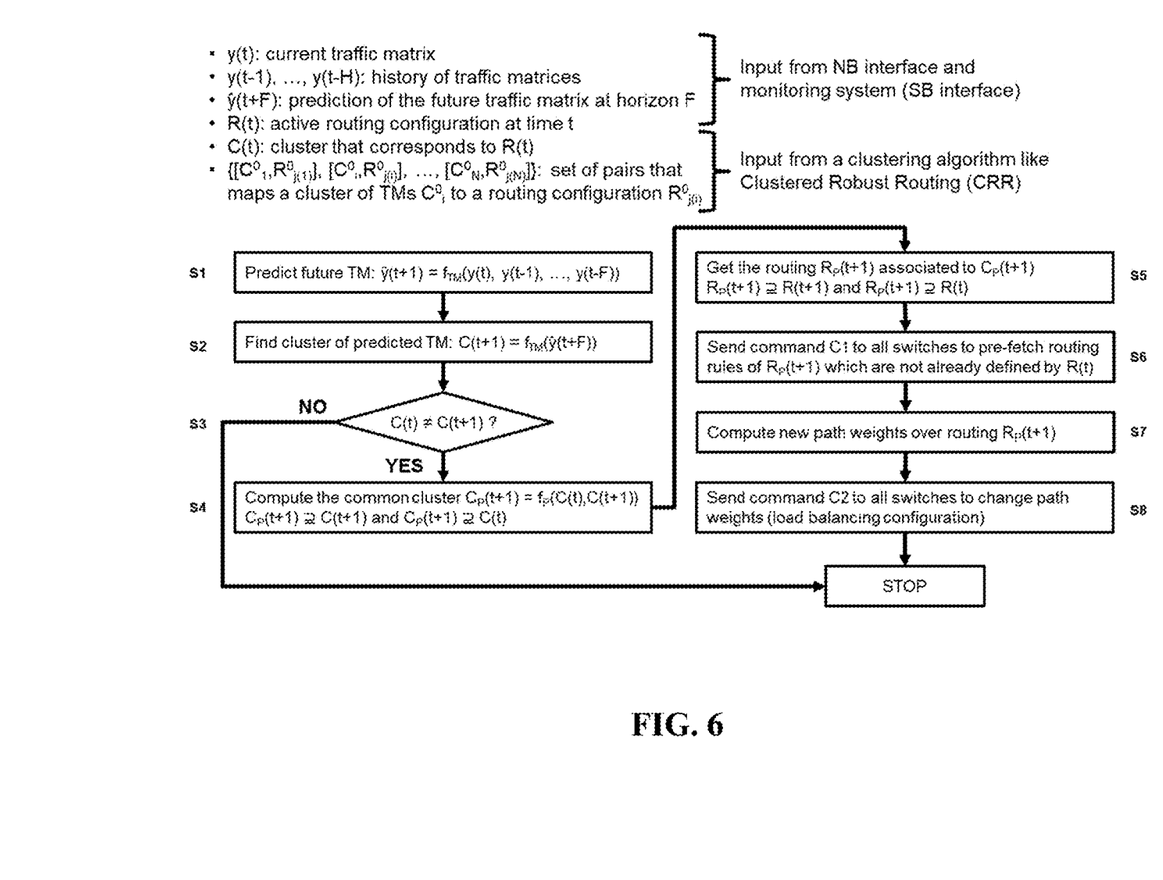
FIG. 6 shows a procedure performed by a device according to an embodiment of the disclosure.

Operations of the TCM module are shown in FIG. 6, wherein:

The TM y(t) is represented as a vector where each entry represents an origin-destination flow. The number of dimensions is equal to the number of OD flows.

A cluster C(t) is represented by its extreme points, namely a list of vectors. Each vector of the list represents a pseudo-matrix where each entry is an origin-destination flow of size decided by the clustering module.

A TE/routing configuration R(t) is a matrix that associates to each origin-destination flow the set of links that are used to route the traffic. R(t) has a number of rows equal to the number of links and a number of columns equal to the number of origin-destination flows. The product R(t)*y(t) provides the traffic load of links at time t.

S1: the device 100 may predict or obtain the predicted TM 101a of the next period of time y(t+1) as a function of the historical information of the TMs 101 collected by, e.g., the monitoring system. The amount of historical data F, as well as other parameters of the prediction function $f_{TM}(\ldots)$, are provided as input parameters by a management application.

An example of a prediction function used by the device 100 may be an ARIMA(m,n) with F=(m,n) applied to each entry of the TM vector.

S2: the clusters 102 that contain the predicted TM C(t+1) are then computed. To this end, each entry of the predicted TM 101a may be compared to each entry (i.e., origin-destination flows) of the extreme points of each cluster 102 to verify if the cluster 102 contains the predicted TM 101a.

S3: if the cluster C(t) that contains the current TM (at time t) is different from the cluster C(t+1) that contains the next predicted TM (i.e., the predicted TM 101a of the next period of time t+1 belongs to a cluster different than the current one), continue to step S4.

Otherwise, go to STOP.

S4: the device 100 retrieves the parent cluster $C_P(t+1)$ that contains both the current cluster C(t) (at time t) and the cluster C(t+1) that contains the next predicted TM 101a. For example, the parent cluster 102 can be found by traversing bottom-up the hierarchy of clusters 102 computed by the HCR module: it starts from the nodes in the hierarchy that represent C(t) and C(t+1) and traverses the nodes at higher levels in the hierarchy until the same parent node is found.

S5: the device 100 may then select the routing configuration $R_P(t+1)$ associated to the cluster $C_P(t+1)$. By construction the routing configuration $R_P(t+1)$ contains the routing paths of both R(t) and R(t+1), which represents the routing configurations of C(t) and C(t+1), respectively.

S6: the device 100 may then select the command C1, which contains the routing paths of the configuration $R_P(t+1)$, to all the switches 300. This command permits pre-fetching the routing configuration 104 before the new paths/routes are really used.

S7: once the command C1 has been received by all switches 300, the device 100 may compute the new weights to be assigned to all pre-fetched routes of the routing configuration $R_P(t+1)$. These weights are used by the internal load balancing mechanism of each switch 300 to split the traffic over multiple routes during the transmission. For example, the weights are used by a weighted round robin scheduling algorithm, in order to select the path to be used for the transmission.

S8: the device 100 may then select the command C2, which contains the path weights computed in the set S7, to all switches 300. Since $R_P(t+1)$ contains the paths/routes of both R(t) and R(t+1), the transition from the paths in R(t) to the paths in R(t+1) is performed smoothly.

Figure 7:
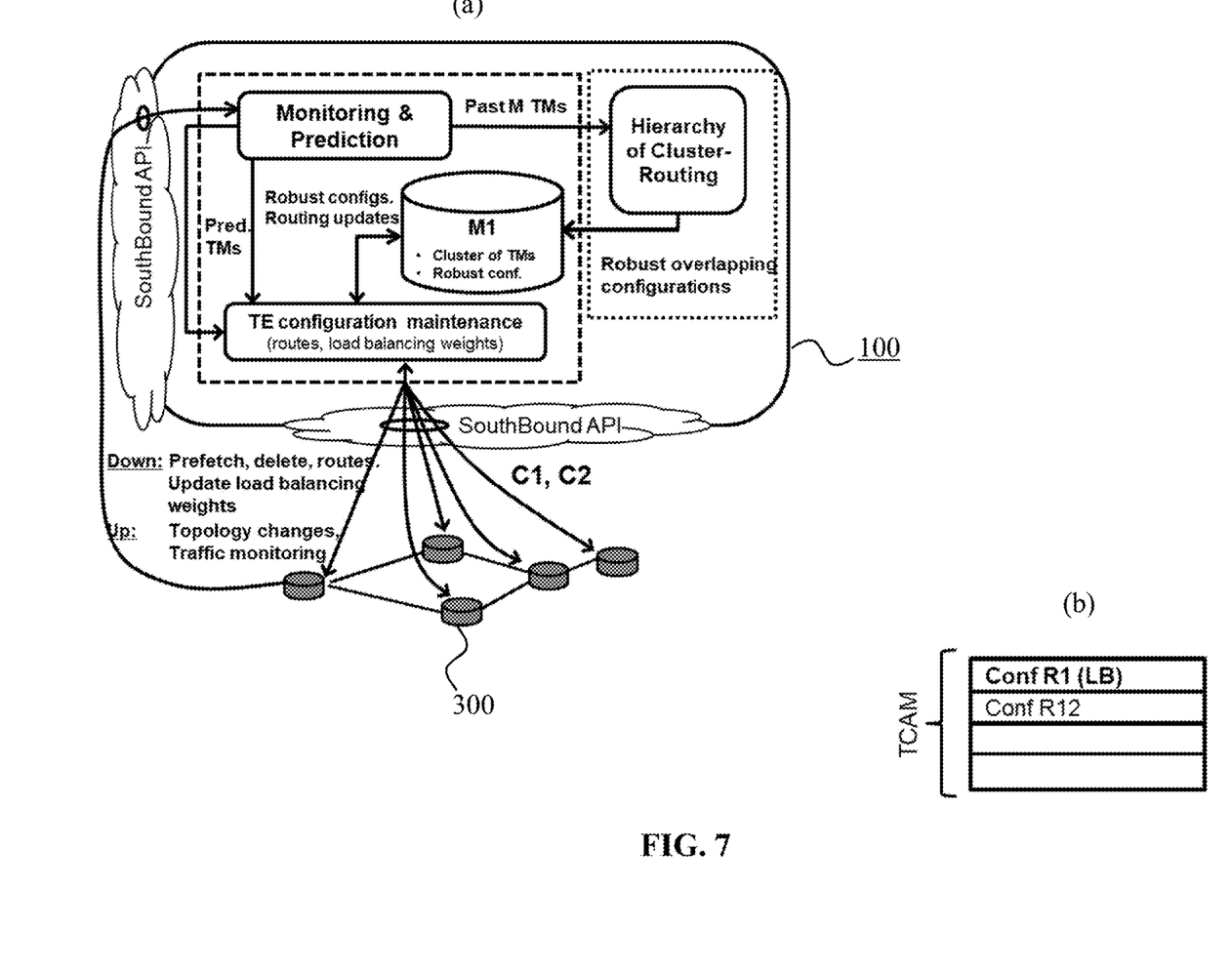
FIG. 7 shows (a) a device according to an embodiment of the disclosure implemented in an architecture of a SDN controller, which provides signals C1 and C2 to switches, and shows (b) a forwarding table at a switch after pre-fetching signal C1.

As illustrated in FIG. 7(a), the following signals and commands can be used by the device 100:

C1: the device 100 may pre-fetch forwarding plane tables containing rules that are a super-set of rules previously installed in the switches 300 (the new forwarding rules may overlap forwarding rules installed before sending this new command C1).

C2: the device 100 may update load balancing weights to activate the new routing configurations 104 as network routing configuration. The number of weights sent for each tunnel may not be fixed, but may vary according to a size of the pre-fetched routing configuration 104.

As illustrated in FIG. 7(b), the result of the command C1 can be observed in the forwarding plane data structure of a switch 300, as it will be composed of:

Load balancing weights that are non-zero for routes belonging to the active routing configuration (R1 in FIG. 7(b)).

Every time the network routing configuration 104 is updated, new routes that partially overlap with the active routing configuration 104 can be observed from forwarding rules (R12 in FIG. 7(b)).

Figure 8:
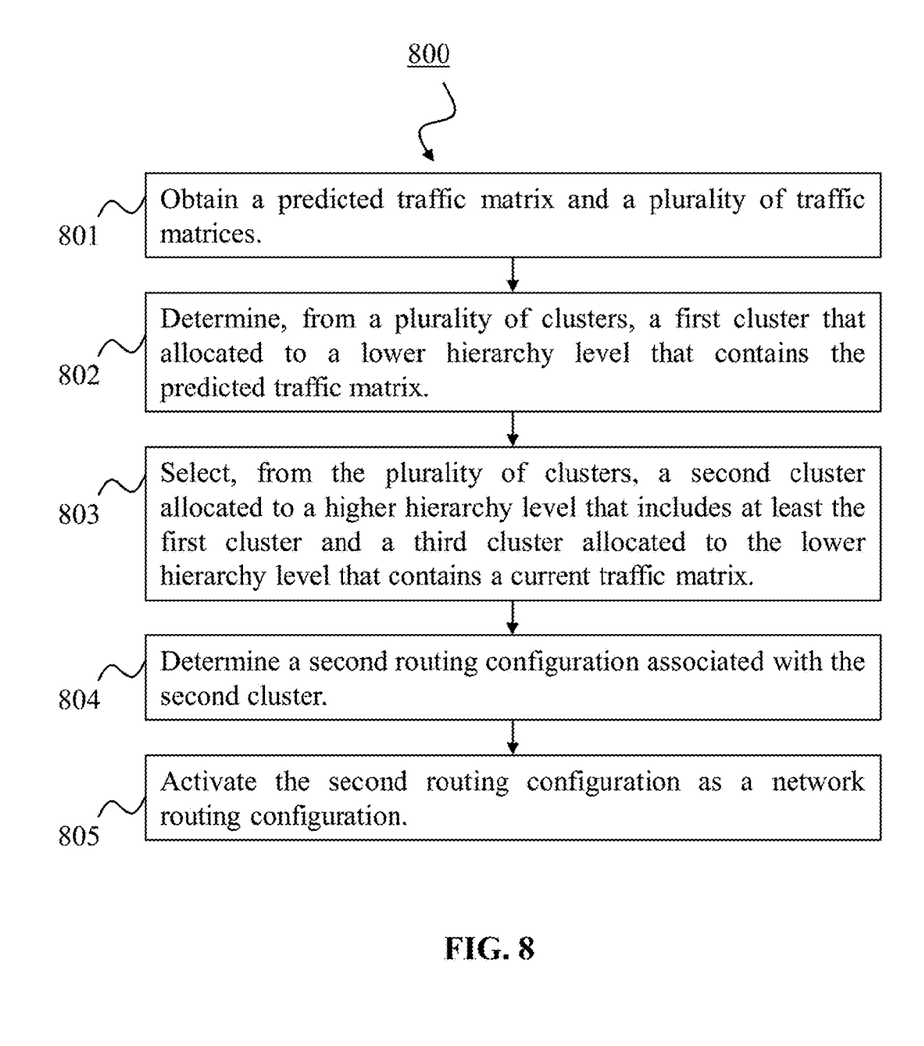
FIG. 8 shows a method according to an embodiment of the disclosure.

FIG. 8 shows a method 800 according to an embodiment of the disclosure. The method 800 can be used for controlling network routing configurations in a network. The method 800 may be carried out by the device 100 according to an embodiment of the disclosure.

The method 800 comprises: A step 801 of obtaining a predicted traffic matrix 101a and a plurality of traffic matrices 101. Further, a step 802 of determining, from a plurality of clusters, a first cluster 102a allocated to a lower hierarchy level that contains the predicted traffic matrix 101a. Thereby, the clusters 102 are arranged in a hierarchical structure over the predicted traffic matrix 101a and the plurality of traffic matrices 101, each of the plurality of clusters 102 is associated with a routing configuration 104, and the plurality of clusters 102 are allocated to at least two different hierarchy levels, a cluster 102 allocated to a higher hierarchy level including multiple adjacent clusters 102 allocated to the hierarchy level below.

Further, the method 800 comprises a step 803 of selecting, from the plurality of clusters 102, a second cluster 102b allocated to a higher hierarchy level that includes at least the first cluster 102a and a third cluster 102c allocated to the lower hierarchy level that contains a current traffic matrix 101c. Further, a step 804 of determining a second routing configuration 104b associated with the second cluster 102b. Finally, a step 805 of activating the second routing configuration 104b as a network routing configuration.

In summary, embodiments of the present disclosure achieve multiple benefits. In particular, routing and load balancing can be decoupled, so that routing can be smoothly updated without degrading performance. The smoothness is obtained through the updating of load balancing weights. The embodiment of the disclosure works for routing updates in all TE approaches: Dynamic, Stable, Semi-Stable.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A hardware controller for controlling network routing configurations in a network, the hardware controller being configured to:

obtain a predicted traffic matrix and a plurality of traffic matrices;

determine, from a plurality of clusters, the plurality of clusters being arranged in a hierarchical structure over the predicted traffic matrix and the plurality of traffic matrices, a first cluster allocated to a lower hierarchy level that contains the predicted traffic matrix, wherein each of the plurality of clusters is associated with a routing configuration, the first cluster is associated with a first routing configuration, and the plurality of clusters are allocated to at least two different hierarchy levels, a cluster allocated to a higher hierarchy level including multiple adjacent clusters allocated to a hierarchy level below;

select, from the plurality of clusters, a second cluster allocated to the higher hierarchy level that includes at least the first cluster and a third cluster allocated to the lower hierarchy level that contains a current traffic matrix;

determine a second routing configuration associated with the second cluster; and activate the second routing configuration as a network routing configuration.

2. A method for controlling network routing configurations in a network, the method comprising:

obtaining a predicted traffic matrix and a plurality of traffic matrices;

determining, from a plurality of clusters, the plurality of clusters being arranged in a hierarchical structure over the predicted traffic matrix and the plurality of traffic matrices, a first cluster allocated to a lower hierarchy level that contains the predicted traffic matrix, wherein each of the plurality of clusters is associated with a routing configuration, the first cluster is associated with a first routing configuration, and the plurality of clusters are allocated to at least two different hierarchy levels, a cluster allocated to a higher hierarchy level including multiple adjacent clusters allocated to a hierarchy level below, selecting, from the plurality of clusters, a second cluster allocated to the higher hierarchy level that includes at least the first cluster and a third cluster allocated to the lower hierarchy level that contains a current traffic matrix, determining a second routing configuration associated with the second cluster, and activating the second routing configuration as a network routing configuration.

3. The method according to claim 2, wherein the activation of the second routing configuration comprises: sending a command indicating the second routing configuration to a plurality of or all switches in the network.

4. The method according to claim 2 wherein the activation of the second routing configuration comprises:

determining a weight for each routing path of a plurality of routing paths contained in the second routing configuration; and activating the plurality of routing paths of the second routing configuration.

5. The method according to claim 4, wherein the activation of the second routing configuration further comprises:

sending a command indicating the determined weights of the plurality of routing paths of the second routing configuration to a plurality of or all switches in the network.

6. The method according to claim 2, further comprising:

deactivating a routing configuration as a network routing configuration by deactivating each routing path of a plurality of routing paths contained in the routing configuration, based on the routing configuration being associated with a cluster that does not contain the predicted traffic matrix.

7. The method according to claim 2, further comprising:

determining the first routing configuration associated with the first cluster; and activating the first routing configuration as a network routing configuration.

8. The method according to claim 2, further comprising:

selecting, as the second cluster, a cluster allocated to a higher hierarchy level that is determined based on a deviation of the predicted traffic matrix from the current traffic matrix.

9. The method according to claim 8, further configured to comprising:

determining a higher hierarchy level further up based on a larger deviation and a higher hierarchy level further down based on a smaller deviation.

10. The method according to claim 2, further comprising:

merging at least two adjacent clusters on a same hierarchy level to generate a new cluster on a hierarchy level further up.

11. The method according to claim 10, wherein the merge of the at least two adjacent clusters comprises:

merging the traffic matrices contained in each of the at least two adjacent clusters into a set of traffic matrices;

calculating a convex polyhedral approximating a convex hull of the set of traffic metrics; and keeping extreme points of the convex polyhedral.

12. The method according to claim 10, further comprising:

generating a new routing configuration associated with the new cluster based on the routing configurations associated respectively with each of the at least two adjacent clusters.

13. The method according to claim 11, further comprising:

generating the plurality of clusters allocated to the at least two different hierarchy levels.

14. The method according to claim 12, further comprising:

generating the plurality of clusters allocated to the at least two different hierarchy levels.

* * * * *

UNITED STATES PATENT AND TRADEMARK OFFICE
CERTIFICATE OF CORRECTION

| | | |
|---|---|---|
| PATENT NO. | : 12,010,013 B2 | Page 1 of 1 |
| APPLICATION NO. | : 17/396367 | |
| DATED | : June 11, 2024 | |
| INVENTOR(S) | : Paris et al. | |

It is certified that error appears in the above-identified patent and that said Letters Patent is hereby corrected as shown below:

In the Claims

Claim 9: Column 14, Lines 21 and 22: "The method according to claim 8, further configured to comprising:" should read -- The method according to claim 8, further comprising: --.

Signed and Sealed this
Fifteenth Day of April, 2025

Coke Morgan Stewart
*Acting Director of the United States Patent and Trademark Office*